(12) United States Patent
Boulby

(10) Patent No.: US 9,489,612 B2
(45) Date of Patent: Nov. 8, 2016

(54) JEWELLERY WITH TAG

(71) Applicant: KIROCO LIMITED, West Yorkshire (GB)

(72) Inventor: Simon Boulby, West Yorkshire (GB)

(73) Assignee: Kiroco Limited (GB)

( * ) Notice: Subject to any disclaimer, the term of this patent is extended or adjusted under 35 U.S.C. 154(b) by 0 days.

(21) Appl. No.: 14/416,995

(22) PCT Filed: Jul. 26, 2013

(86) PCT No.: PCT/GB2013/052004
§ 371 (c)(1),
(2) Date: Jan. 23, 2015

(87) PCT Pub. No.: WO2014/016609
PCT Pub. Date: Jan. 30, 2014

(65) Prior Publication Data
US 2015/0294214 A1    Oct. 15, 2015

(30) Foreign Application Priority Data

Jul. 27, 2012 (GB) .................................. 1213440.9

(51) Int. Cl.
| | | |
|---|---|---|
| *H04Q 5/22* | (2006.01) | |
| *G06K 19/077* | (2006.01) | |
| *A44C 15/00* | (2006.01) | |
| *A44C 19/00* | (2006.01) | |
| *A44C 27/00* | (2006.01) | |

(52) U.S. Cl.
CPC ......... *G06K 19/07762* (2013.01); *A44C 15/00* (2013.01); *A44C 15/004* (2013.01); *A44C 19/00* (2013.01); *A44C 27/00* (2013.01); *G06K 19/07758* (2013.01)

(58) Field of Classification Search
None
See application file for complete search history.

(56) References Cited

U.S. PATENT DOCUMENTS

| | | | |
|---|---|---|---|
| 2008/0094215 A1 | 4/2008 | Amador et al. | |
| 2008/0168270 A1* | 7/2008 | Kulakowski | G06Q 20/352 713/168 |
| 2008/0238627 A1* | 10/2008 | Oldham | H02J 7/0054 340/10.1 |
| 2009/0258678 A1 | 10/2009 | Chava et al. | |
| 2010/0005835 A1 | 1/2010 | Johnson, Sr. et al. | |
| 2010/0182150 A1* | 7/2010 | Edelstain | B65D 19/38 340/572.8 |
| 2012/0042363 A1* | 2/2012 | Moosavi | H04L 9/3228 726/5 |
| 2012/0323960 A1* | 12/2012 | Gamaley | H04L 51/28 707/769 |
| 2013/0253950 A1* | 9/2013 | Vanderpohl, III | G06F 19/3456 705/3 |

FOREIGN PATENT DOCUMENTS

| | | |
|---|---|---|
| AU | 2003203937 A1 | 12/2003 |
| CN | 102 332 106 A | 1/2012 |

OTHER PUBLICATIONS

PCT International Search Report and the Written Opinion for PCT/GB2013/052004, mailed Oct. 28, 2013, 15 pgs.
GB Search Report for GB1213440.9, dated Nov. 26, 2012, 4 pgs.
GB Examination Report for GB1213440.9 dated Oct. 29, 2014, 4 pgs.

* cited by examiner

*Primary Examiner* — Ojiako Nwugo
(74) *Attorney, Agent, or Firm* — Patterson Thuente Pedersen, P.A.

(57) ABSTRACT

A piece of jewelry, wherein the jewelry comprises at least one tag or chip programmed with at least a unique identification code, and a tag reader is configured to read the tag or chip when the tag reader and the piece of jewelry touch, or come into close contact and, display a message or content associated with the unique identification code.

14 Claims, 11 Drawing Sheets

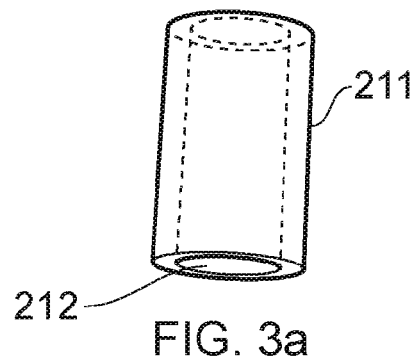
FIG. 3a
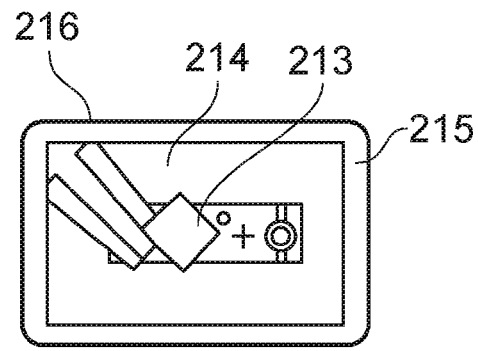
FIG. 3b
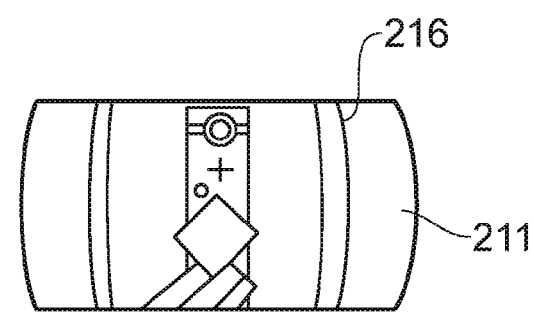
FIG. 3c
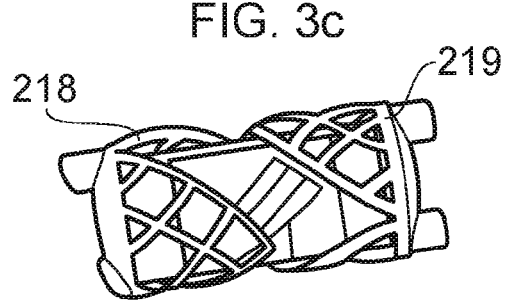
FIG. 3d
FIG. 3e
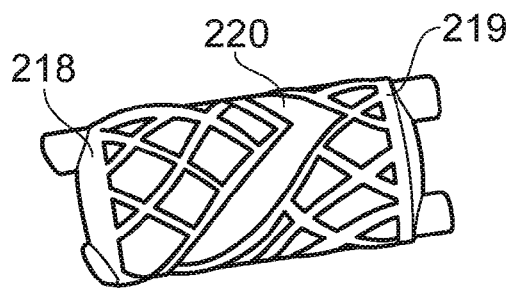
FIG. 3f
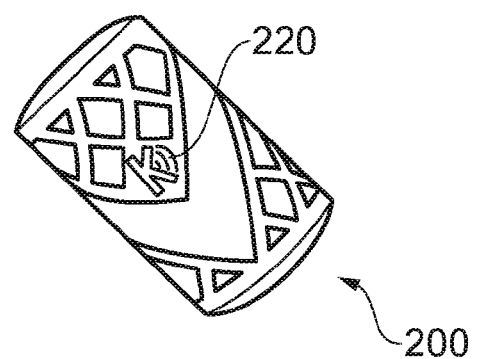
FIG. 3g

JEWELLERY WITH TAG

RELATED APPLICATIONS

The present application is a National Stage entry of International Application No. PCT/GB2013/052004 filed Jul. 26, 2013 which claims the benefit of GB Application No. 1213440.9, Jul. 27, 2012, said applications being hereby incur fated by reference in their entirety.

This invention relates to a piece of jewelry, wherein the jewelry comprises at least one tag or chip programmed with at least a unique identification code, and a tag reader is configured to read the tag or chip when the tag reader and the piece of jewelry touch, or come into close contact and, display a message or content associated with the unique identification code.

BACKGROUND

Items of jewelry are often given as gifts to signify important moments in a life such as a wedding or engagement, birthdays, or other celebrations. Items of jewelry include rings, pendants, bracelets, beads, brooches and the like. Often the gift giver opts to engrave the item to impart a special personal message for the recipient: "I love you" or perhaps even "For you, on our wedding day 12 Aug. 2006" or "Congratulations on passing your exams". Typically, wedding, engagement and eternity rings are engraved on the inner surface of the ring in a symbolic gesture of intimacy; only the giver and receiver need know the message is there and what the message is. Celebration jewelry, given to a recipient to mark an important life event, may include a bracelet or necklace with charms, beads, or pendants, and these items may also be engraved with a message or date adding that personal intimate touch Engraving items or pieces of jewelry may require some skill, time, and effort and often requires some sort of machinery or engraving tool. It can be difficult to engrave very small pieces of jewelry and especially challenging to engrave pieces of jewelry with patterned or contoured surfaces. Furthermore, there is a limited space in which a person may engrave a message on any piece of jewelry and the character size is limited so the resultant content of the message is also limited. For example, the message on the inside of a wedding band is typically restricted to only a few characters, for example 25 characters. Clearly any such message is thus very limited.

Radio-frequency identification (RFID) uses radio-frequency electromagnetic fields to transfer data from a tag or chip attached to an object, principally for the purposes of automatic identification (e.g. allowing a person access to a building) and tracking and monitoring products (such as stocktaking or assembly line monitoring). Some tags or chips are passive and do not require a battery. Passive tags or chips are powered by the electromagnetic fields used to read them. Non passive tags or chips use a local power source and emit radio waves (electromagnetic radiation at radio frequencies). The tag or chip contains electronically stored information which can be read by a reader from up to several meters away. Near field communication (NFC) is a set of standards covering communications protocols based on existing RFID. NFC requires touch or bringing a reader and tag into close proximity to each other in order to establish radio communication with each other.

The prior art shows a variety of uses of RFID tags and chips. International patent application WO 2011/154213A provides a system for monitoring the stock in dynamic stores using RFID and discloses an RFID communication system, comprising at least a first stationary RFID antenna and a second stationary RFID antenna for transmitting and receiving data; and an RFID transponder fitted to an item or a group of items, wherein the RFID transponder electronically stores at least one identifier of the item or the group of items, and wherein the first RFID antenna is placed at an intake region and the second RFID antenna is placed at an issue region of a storage path of the dynamic store in order to detect the item or the group of items using the identifier of the RFID transponder.

Taiwanese patent application TW 2009/19344A discloses the use of RFID tags in ticket applications. An anti-counterfeiting electronic ticket system is disclosed, which is used as an anti-counterfeiting application to prevent a simple electronic ticket from misuse of an illegal duplication means by means of a photographing method. A certificate can be an image, a pattern or words, and is printed on a sticker or on the surface of other entity articles by means of an anti-counterfeiting printing technology. Alternatively, the certificate can be a wireless radio frequency identification (RFID) label to form an entity certificate. A user holds an electronic ticket image displayed on a monitor of a mobile apparatus and a pre-registered entity certificate, utilizes a ticket-examining apparatus to read content information of the entity certificate and the electronic ticket, and verifies by mutual certification method of the two to be used as imitation prevention of the electronic ticket.

BRIEF SUMMARY OF THE DISCLOSURE

In accordance with a first aspect of the present invention, there is provided an item of jewelry with at least one passive tag, wherein the passive tag is programmed with at least a unique identification code, and wherein the unique identification code, when read from the passive tag by a tag reader having a display, authorises access to a message or content associated with the unique identification code, the message or content to be displayed on the display of the tag reader.

Preferably, the at least one tag is a radio frequency identification (RFID) tag or chip configured to operate as a near field communication (NFC) tag or chip. The tag may be any tag adapted to use near-field communication technology.

In some embodiments the at least one tag or chip operates on a very small range of less than about 1 cm.

In certain embodiments the at least one tag or chip is positioned on or in the item of jewelry and coated with a resin, glass or metal to protect the chip or tag. The positioning of the at least one tag or chip provides three dimensional readability of the tag or chip by the tag reader.

The tag reader may be a personal electronic device such as a smartphone or tablet computer.

In other embodiments the at least one tag or chip is layered on the surface of the item of jewelry.

In accordance with a second aspect of the present invention, there is provided a system comprising an item of jewelry with a passive tag, and a tag reader with a display, wherein:

the passive tag is programmed with at least a unique identification code;

the tag reader is adapted to read the identification code from the passive tag when the tag reader and the item of jewelry touch, or come into close proximity with each other; and the tag reader is configured to access a message or content that is associated with the unique identification code and to display the message or content on the display.

Preferably, the reader is adapted to go through an authorization stage whereby the unique identification code of the tag and an authorisation code assigned to the reader must match before the tag reader can access the message or content assigned to the identification code of the tag.

The message or content may be stored on a remote data storage device (such as a remote server, or cloud data storage system), and the tag reader may be configured to be able to communicate with the remote data storage device.

In particularly preferred embodiments, the tag reader is configured as a smart phone or similar communications device having tag reading functionality as well as being able to connect to the Internet.

In some embodiments, the tag reader is adapted to preload the message or content assigned to the unique identification code so that once preloaded, when the item of jewelry with a passive tag come into contact or close proximity to one another, the associated message or content is instantly displayed and the reader does not rely on connectivity with the remote data storage device.

In a third aspect of the present invention, there is provided a method of delivering an electronic message, including:
 i) providing an item of jewelry with a tag having a unique identification code,
 ii) reading the unique identification code from the tag with a tag reader, and
 iii) using the unique identification code to request delivery of a message or content associated with the unique identification code to the tag reader to be displayed on the display of the tag reader.

Preferably, request delivery of a message includes authorising delivery of a message.

Preferably, the tag reader can only access the message or content associated with the unique identification code if it is authorised to do so. The tag reader is provided with an authorisation code such as an IP address, SIM number, or mobile application identification number. The authorisation code of the tag reader and the tag need to match in order for the message to be delivered.

NFC tag readers work in a standardised manner, such that all tags can be read by all readers. However, the present invention relies on the fact that only authorised users can access their messages (i.e. only the wearer of the jewelry or individuals that the wearer has explicitly granted access should be able to retrieve messages intended for their consumption). To ensure that only authorised access is permitted the system registers a pairing between the end user's mobile application ID number and each of the ID numbers of the items of jewelry they currently own. Any subsequent access to the messages stored for a particular item of jewelry is only granted to the mobile application running on the tag reader, such as a smartphone, that the item of jewelry was registered as being paired with (i.e. the tag reader, such as a smartphone, of the recipient of the jewelry). In addition, extended access to an item of jewelry's messages may be granted, but only if the wearer explicitly identifies the ID number of the additional authorised mobile applications (i.e. the smartphones of trusted friends or relatives).

In a fourth aspect, there is provided a method of manufacturing a piece of jewelry comprising a passive tag, the method comprising the steps of:
 a) selecting a bead of desired size, the bead having an inner passageway;
 b) selecting a passive tag sized such that a surface area of the passive tag is smaller than a surface area of the bead;
 c) positioning the passive tag on an outer surface of the bead;
 d) positioning a reticulated mesh over the bead and passive tag, the reticulated mesh having a passive tag indicator;
 e) checking the passive tag's readability with a reader, the reader positioned in the region of the passive tag indicator;
 f) coating the mesh in enamel or resin heated to less than 100° C. to fill the gaps in the mesh;
 g) filing and polishing the enamel or resin;
 h) checking a readability of the passive tag with a reader in the region of the passive tag indicator.

Manufacturing the bead is particularly challenging because the normal techniques used to manufacture pieces of jewelry may damage the passive tags. The present method provides steps to ensure that passive tags are not damaged during manufacture of the beads by protecting the passive tag using a mesh and by adding enamel or resin at temperatures less than 100° C.

BRIEF DESCRIPTION OF THE DRAWINGS

Embodiments of the invention are further described hereinafter with reference to the accompanying drawings, in which:

FIG. 3 shows a lattice type cylindrical bead.

DETAILED DESCRIPTION

In the described embodiments, like features have been identified with like numerals, albeit in some cases having increments of integer multiples of 100. For example, in different figures, 210, 310, and 410 have been used to indicate bead comprising a passive tag.

Figure 1:
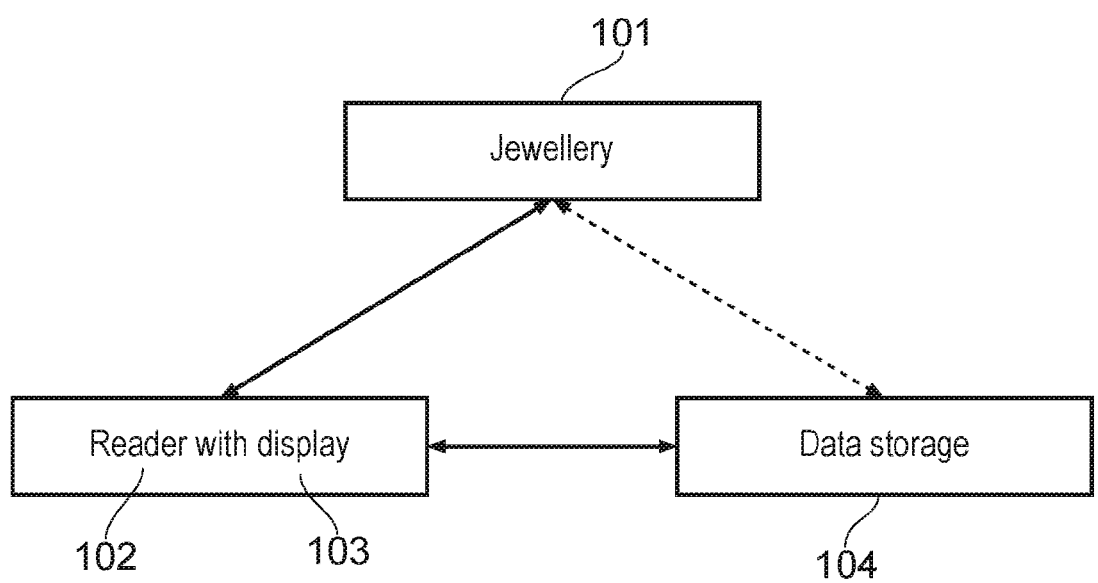
FIG. 1 is a shows a schematic of the system.

FIG. 1 shows a schematic of the system including a piece of jewelry 101, a reader 102 with a display 103 and a remote data storage device 104 to support the reader. The solid lines indicate the communication path and the dotted line indicates the indirect communication path because the jewelry and the data storage device communicate through the reader. The jewelry includes a passive tag or chip within the jewelry or positioned on the jewelry. When the jewelry comes into contact (i.e. touches) or comes into close proximity with a reader in a range of about 0 cm to about 1 cm, the passive tag or chip is energised by the electromagnetic field of the reader.

Each piece of jewelry is assigned a unique identification code within the passive tag or chip. Initially, the remote data storage device is configured to assign a corresponding access code to a particular reader such as the recipient's (i.e. the jewelry wearer's) personal communication device or smart phone. Once the jewelry and smart phone are linked, only the linked smart phone may display information linked to the unique identification code associated with the passive tag or chip. In this manner, the tag reader (or smart phone) is the only authorised reader (i.e. the jewelry wearer's smartphone) allowed to access messages associated with the particular unique identification code of the piece of jewelry.

The system is designed to be easily used by the recipient of the item of jewelry. All interaction with the jewelry and its associated messages is performed through a mobile application.

The giver of the jewelry may at any time update the message they wish to be associated with the item of jewelry they have gifted, in order to convey emotions of significance based around their relationship with the jewelry wearer (e.g. birthday or anniversary messages) or seasonal messages such Christmas or Easter well wishes, and so on. To achieve this, any purchaser of an item of jewelry is provided with a personal account (accessed via a personal website area or via their mobile app). This personal account can be associated with multiple items or jewelry and allows the giver of those items to update messages associated with them all from one location. In addition to text based messages the giver of the jewelry can also incorporate pictures and videos.

Once the giver of the jewelry has updated a message associated with a particular piece of jewelry the system then transfers the message between the remote data storage facility and the authorised mobile application automatically and transparently to the user as soon as a suitable data connection is present (i.e. the user is unaware of the message transfer process taking place in the background). Once transfer is complete the message is then stored indefinitely in the smartphone's non-volatile memory ready for immediate access by the user. This process ensures that when the user attempts to access their messages by "touching" their smartphone and their item of jewelry together, their message is immediately accessed and launched from the smartphone's memory thus giving a smooth and consistent service irrespective of other factors such as the smartphone's current mobile network signal. The message remains in the smartphone's non-volatile memory until it is explicitly deleted by the mobile application (thus giving the opportunity for the jewelry to give the impression it is holding multiple messages if required).

The message may be anything from the "I love you" one might expect to find engraved on the surface of a piece of jewelry, to something more personal and intimate, only to be shared between the giver of the jewelry and recipient (i.e. the jewelry wearer). It is envisaged that the message may include more substantial data such as photographs, voice recordings and longer messages. In this manner, the piece of jewelry may be thought of as an "i-motion" or "personal emotional messaging" device that may be used as a time capsule. A time capsule includes a plurality of messages or alternatively a plurality of beads on a bracelet or necklace, each bead with a unique identification number whereby the giver of the piece of jewelry can save important messages and mark special occasions associated with the piece of jewelry forever.

Figure 2:
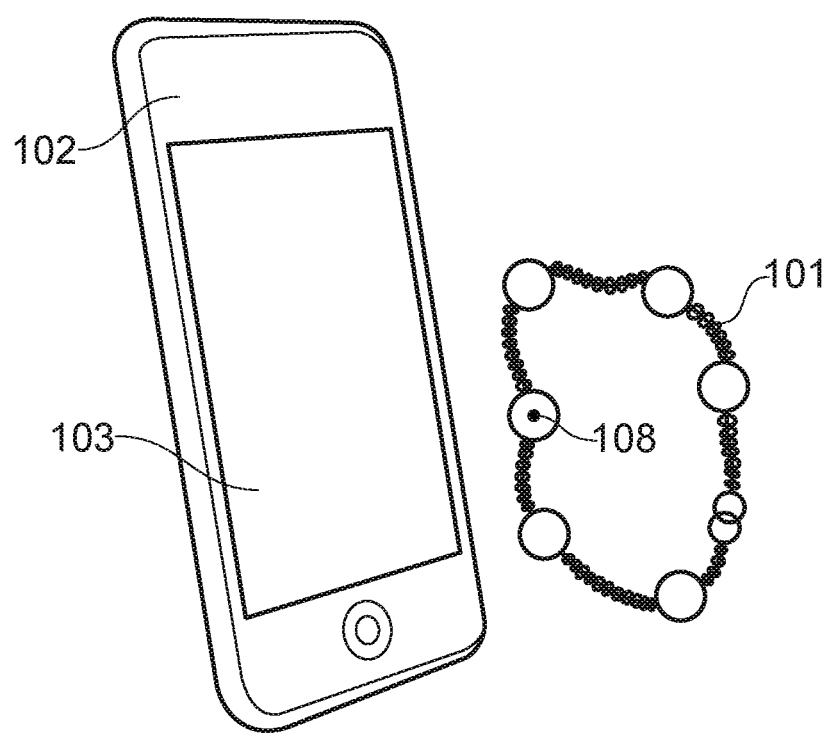
FIG. 2 illustrates a bracelet and reader with a display.
Figure 4A:
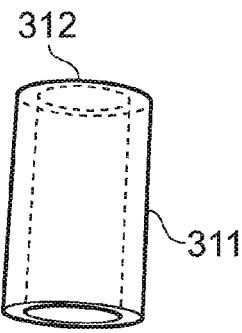
FIG. 4 shows a plain cylindrical bead.
Figure 4B:
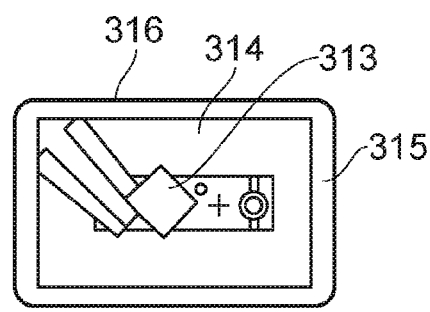
Figure 4C:
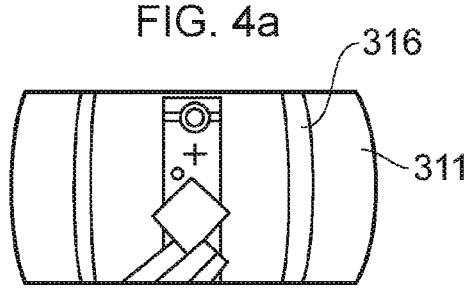
Figure 4D:
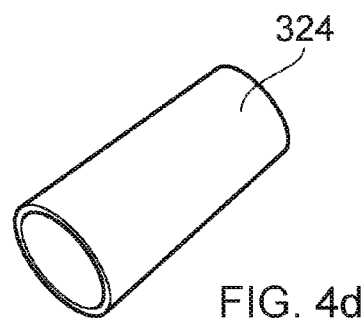
Figure 4E:
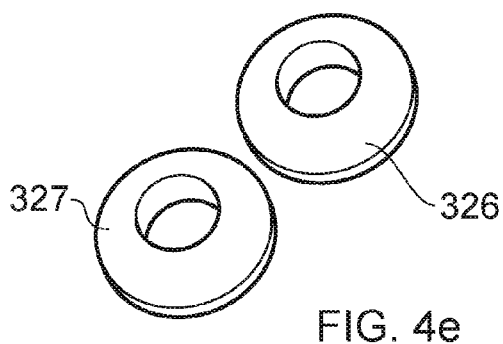
Figure 4F:
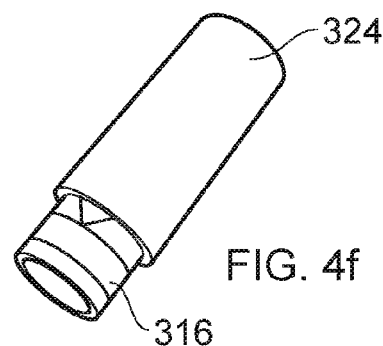
Figure 4G:
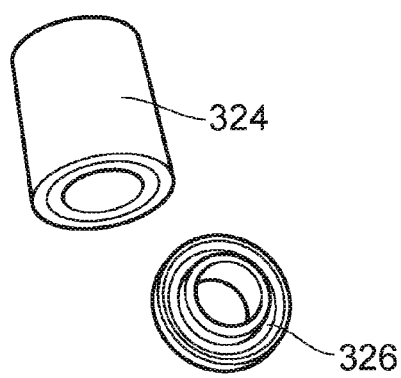
Figure 4H:
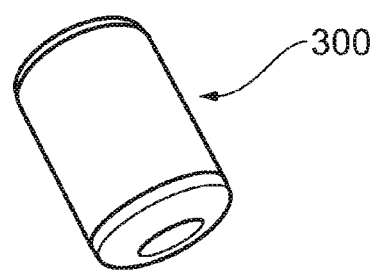
Figure 5A:
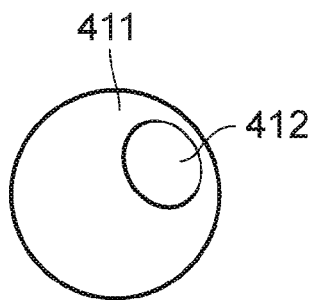
FIG. 5 shows an orb type lattice bead.
Figure 5B:
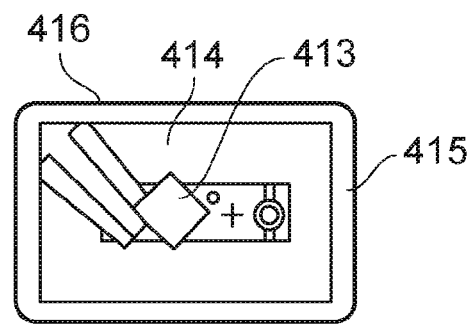
Figure 5C:
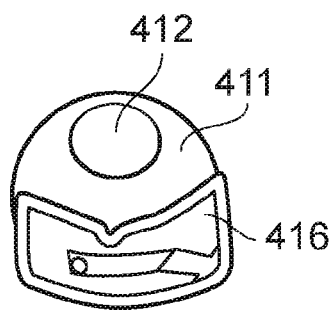
Figure 5D:
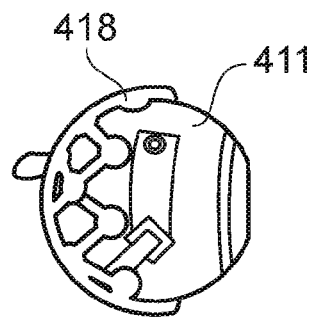
Figure 5E:
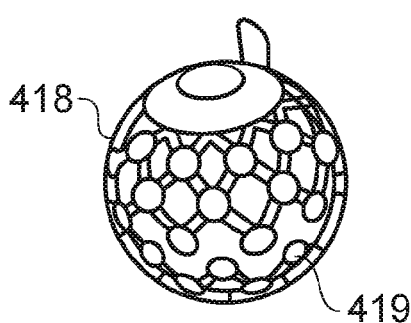
Figure 5F:
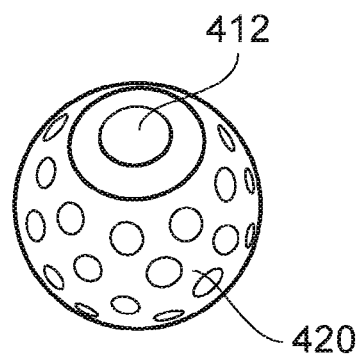
Figure 5G:
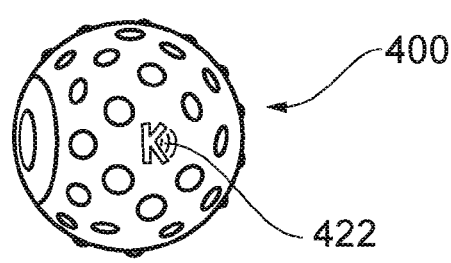
Figure 6A:
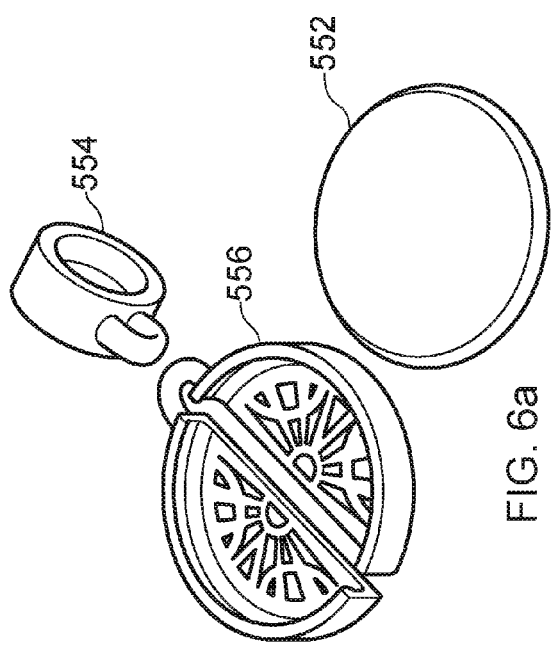
FIG. 6 shows a disk-like bead.
Figure 6D:
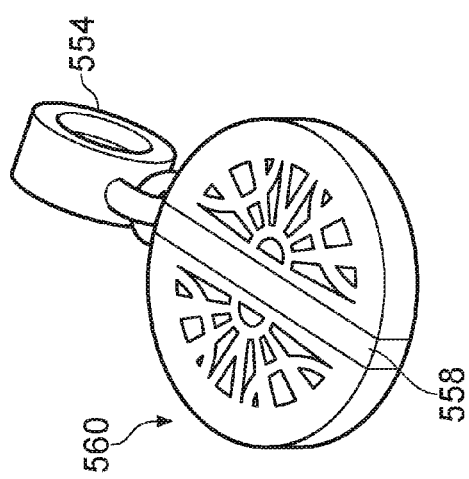
Figure 6B:
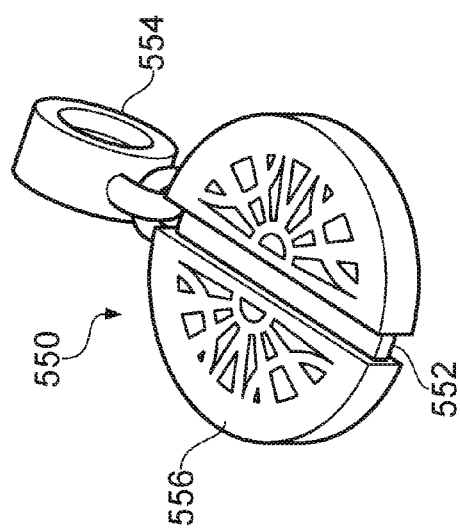
Figure 6C:
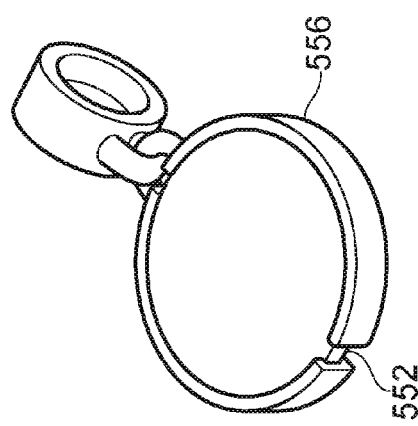
Figure 7D:
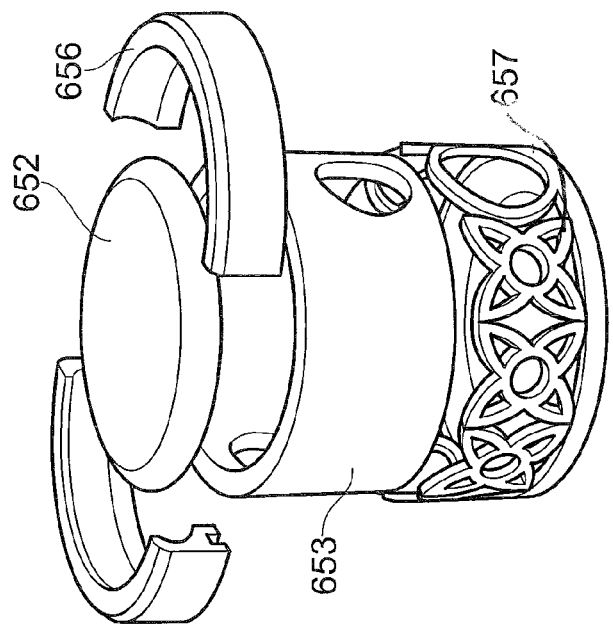
FIG. 7 shows a drum-like bead.
Figure 7B:
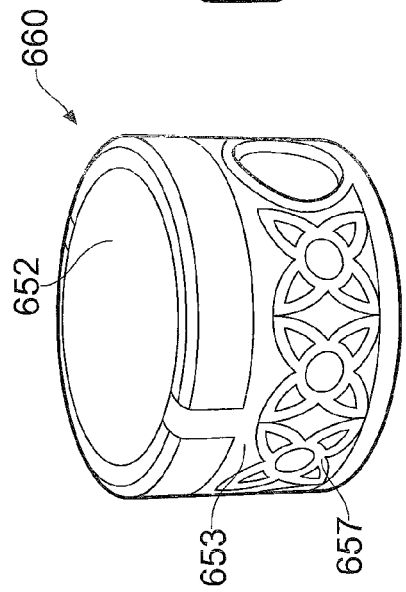
Figure 7C:
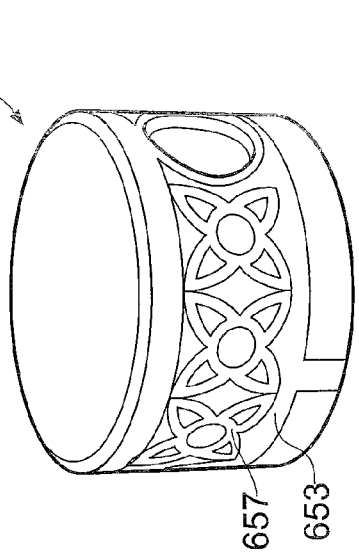
Figure 7A:
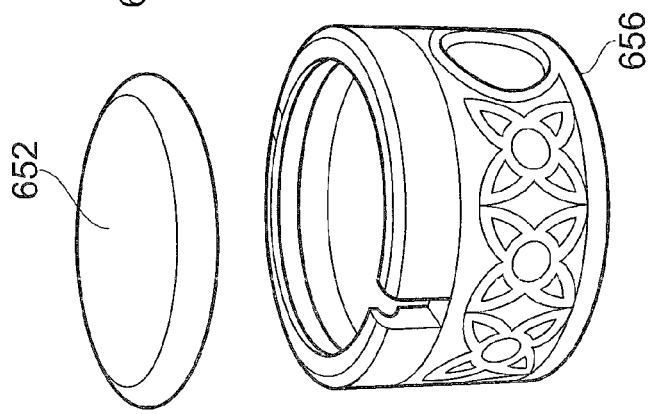
Figure 8A:
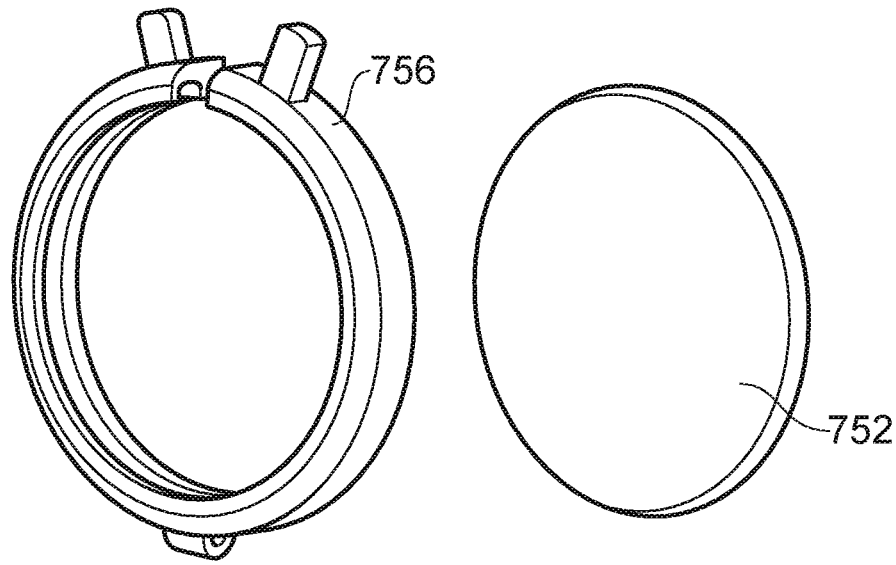
FIG. 8 shows a locket-type bead.
Figure 8B:
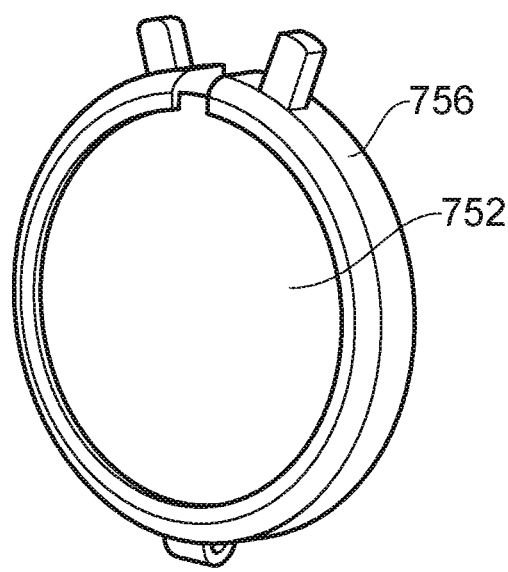
Figure 8C:
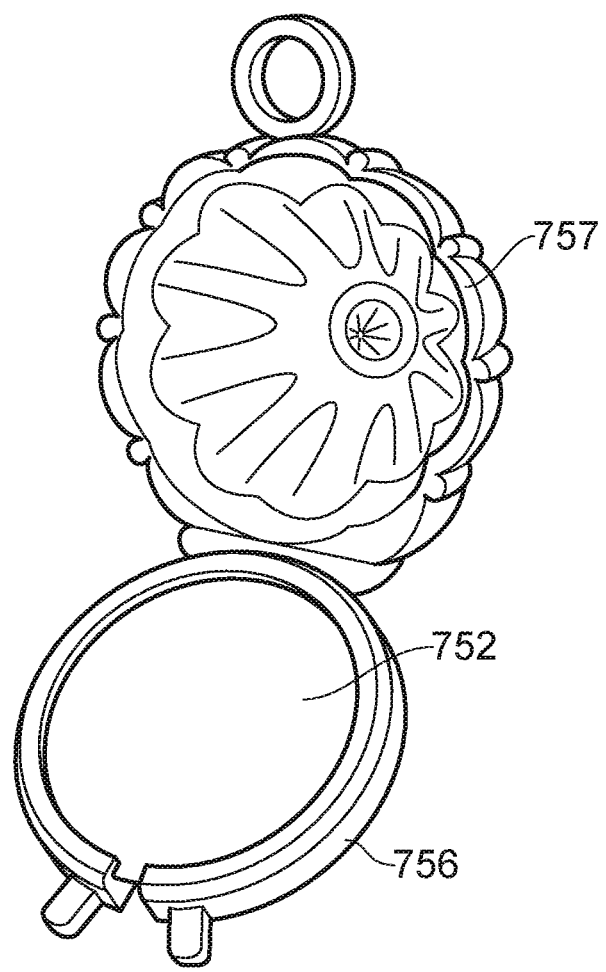
Figure 8D:
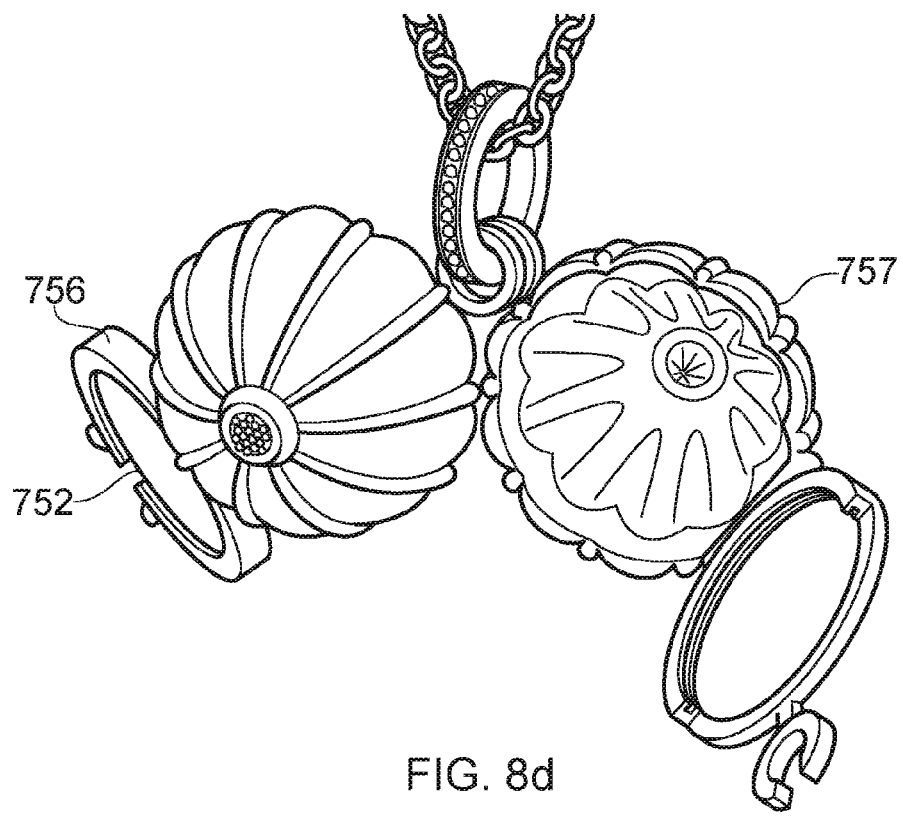
Figure 8E:
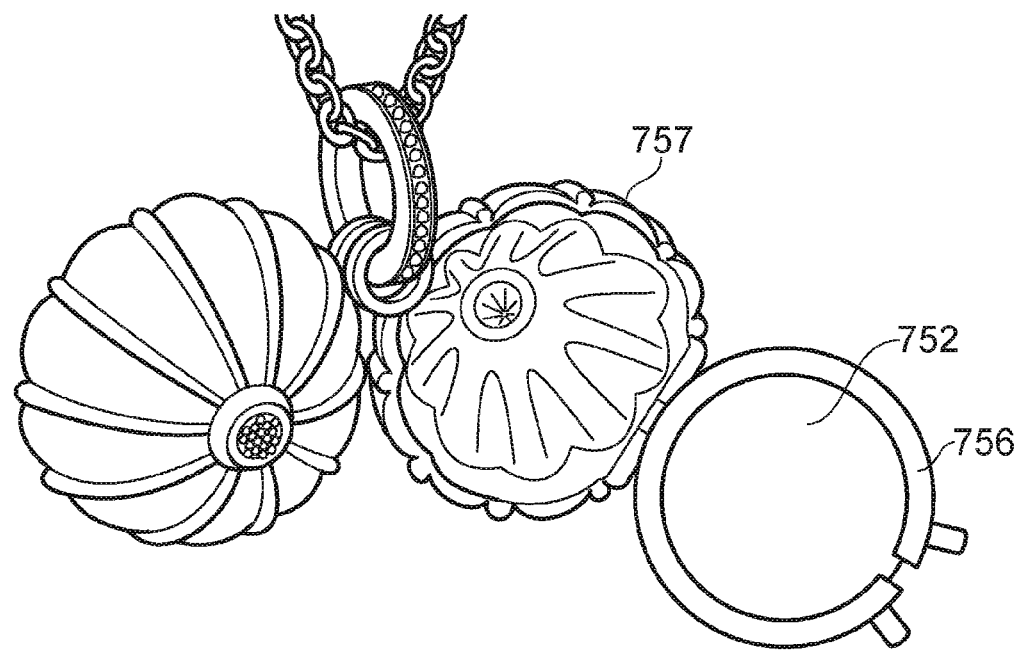
Figure 8F:
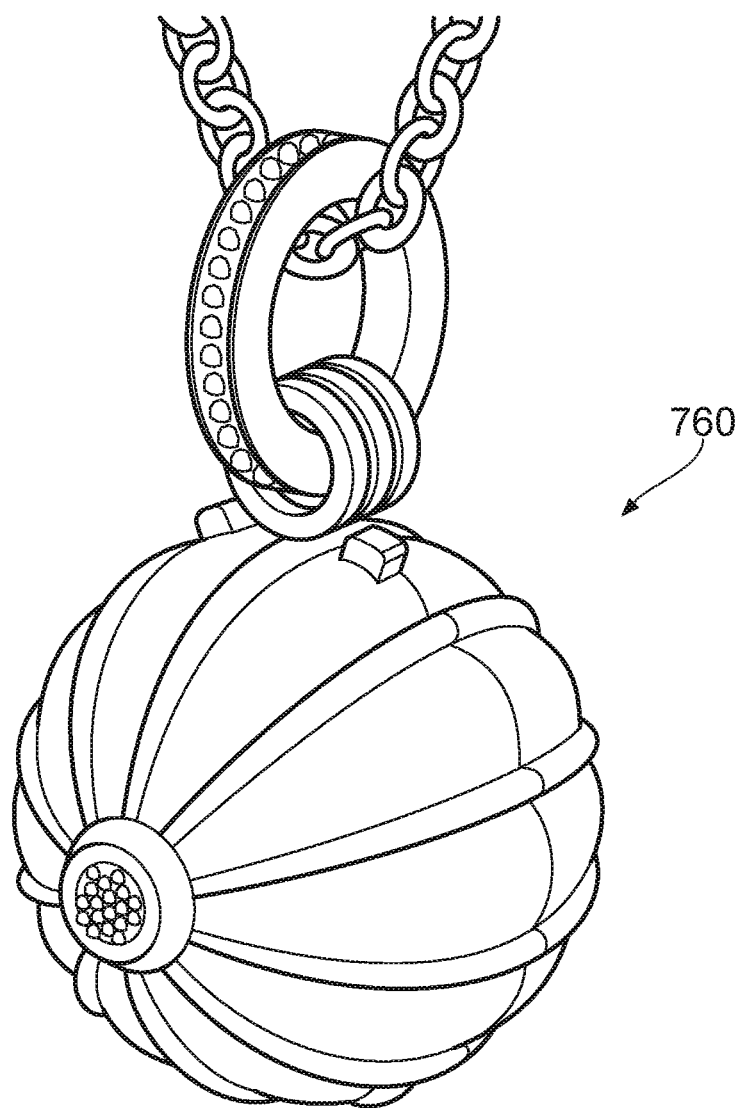

FIG. 2 illustrates a preferred embodiment of the present invention. FIG. 2 depicts an item of jewelry such as a simple bracelet of beads 101. The bracelet has a plurality of beads, one of which includes a tag within or on it 108. A smartphone 102, 103 is also depicted with a reader 102 and a display 103. NFC chips or tags are particularly suitable for the present invention as their range is small and NFC chips or tags require near touch between the tag and the tag reader in order to activate the tag.

The present inventors have developed a method for positioning the tags and antenna onto the surface of the bead and a thin layer of resin to coat the bead and therefore embed the tag within the bead. Resins are particularly good for protecting the NFC tags and antennas and also have decorative properties. Other materials as well as resins may be used including some metals, glasses, and polymer products.

It should be noted that other passive chips or tags could also be used in place of an NFC chip. For example, longer range RFID chips and tags may be used. In fact, any RFID or near-field communication technology may be used.

Embedding multiple tags or chips within or on an item of jewelry will be beneficial and desirable for a number of different purposes.

Using multiple tags or chips provides good three dimensional readability of the jewelry by the tag reader. To improve the likelihood that an item of jewelry will be read immediately by the reader, certain items will be produced with multiple tags that are all associated with the same message storage account on remote data storage facility. This ensures that irrespective of which tag is read on that individual piece of jewelry the message retrieved will always be from the same associated message account. For example, this approach may be adopted in items of jewelry such as bracelets where tag locations can potentially alter through the general movement of the wearer. By incorporating multiple tags throughout the bracelet, the user will be more likely to create a connection with one of the tags, irrespective of how the bracelet has moved on their wrist during the course of the day.

Alternatively, larger items of jewelry or jewelry with distinct sections may benefit from the ability to incorporate multiple tags with ID numbers that are each individually associated with different message storage accounts. In this case, if one tag in a specific part of the jewelry was read it will retrieve a message from a different message storage account than a tag embedded in a different section of the same piece of jewelry. An example of where this functionality would be suitable is within a "Charm" bracelet. These items of jewelry typically have a simple bracelet band that the wearer then adds small jewelry accessories to (known as Charms). Typically each individual Charm is often bought for the wearer by different people. In this case, a Kiroco-Touch system (an application) will offer the ability for the wearer to receive separate messages from each person who bought each individual Charm.

Other embodiments such as beads of other shapes, rings, pendants, and brooches may also have NFC chips and antennas embedded within them.

The system disclosed may also be used in other applications such as security, for example, using the i-motion messaging device for the identification of stolen jewelry. Furthermore, the system may also be used for promotional information or event information for events such as festivals, whereby event information is disseminated to the jewelry.

Manufacturing a piece of jewelry containing a NFC chip or tag is challenging since the processes typically carried out in manufacturing a piece of jewelry often include high temperatures and abrasive mechanical treatment of the piece of jewelry. However, after much trial and error, a method for manufacturing a piece of jewelry comprising at least one passive tag, such that the tag does not undergo undue mechanical and thermal conditions, has been developed by the present Applicant.

The method of manufacturing a piece of jewelry comprising a passive tag includes selecting a bead 210 of desired size, the bead comprising an inner passageway 212.

FIGS. 3 to 5 show the manufacturing steps required to manufacture a piece of jewelry comprising a passive tag.

FIG. 3 shows a lattice type cylindrical bead. FIG. 4 shows a plain cylindrical bead. FIG. 5 shows an orb type lattice bead.

A passive tag 216 is selected for size such that the surface area of the passive tag is smaller than a surface area of the bead. The passive tag includes a substrate 215, a tag 213 and an antenna 214. The passive tag 216 is positioned on the surface of the bead. The passive tag 216 may be simply rested on the surface, or alternatively it may be adhered to the surface of the bead. The passive tag may be retained on the surface of the bead by an outer layer such as a reticulated mesh structure 218, 219. In that sense, it may not need to be adhered using glue, but may simply be positioned on the bead.

A reticulated mesh structure 218, 219 is adapted to encompass the bead and is positioned over the bead. The reticulated mesh has a first 218 and a second portion 219. Furthermore, the reticulated mesh has a portion adapted to allow the end user to locate the passive tag. As such, the mesh is provided with a passive tag indicator 222.

The reticulated mesh is formed from two interlinking portions adapted to link together to form a decorative covering. The mesh is configured so as not to form a significant RF barrier between the passive tag and the tag reader. This is achieved by providing the mesh with a hole size.

Once the reticulated mesh is positioned over the bead, the readability of the passive tag is checked by positioning a passive tag reader (not shown) in the region of the passive tag indicator 222.

The reticulated mesh structure 218, 219 is then coated using enamel or resin 220 to fill the gaps in the mesh. It is beneficial to over fill the mesh with enamel or resin to ensure no defects are formed when the enamel or resin sets. The enamel or resin is heated to temperatures sufficient to make the enamel or resin malleable, but not heated above 100° C., as temperatures above 100° C. have been found to damage the tags.

Once the enamel or resin 220 has set, the excess enamel or resin is filed using a variety of different grade abrasive materials until the reticulated mesh structure is smooth and has the desired appearance.

Finally, the bead 210 is checked again to ensure it remains readable at the passive tag indicator 222.

FIG. 4 shows a plain cylindrical bead 310 having two end caps, 326, 327, separated by a cylindrical tube 324. The bead is manufactured using the same steps as in the mesh covered bead, however, the mesh is replaced by the cylindrical tube and no additional enamel of resin is required. The cylindrical tube covers the passive tag, and the cylindrical tube and end fittings are polished.

FIG. 5 shows an orb bead 410. The tag 416 may be simply rested on the surface of the orb, or alternatively it may be adhered to the surface of the orb. A two part mesh 418, 419 encompasses the bead and is positioned over the bead. The mesh formed by the two parts 418, 419 has a portion adapted to allow the end user to locate the passive tag. As such, the orb is provided with a passive tag indicator 422 in the mesh.

FIG. 6 shows a disk-like unfinished bead 550. Using a pre-coated passive tag 552 arrangement, the mesh support casing 556 only covers one side of the disk-like bead 550. The bead is held on a loop 554, and the mesh 556 forms a substantially U-shape and is configured to accommodate the pre-coated passive tag 552. Once the pre-coated passive tag is in position, the mesh support casing 556 is filled with enamel or resin 558. The finished disk-like bead 560 is then polished to remove any excess enamel and to polish the mesh.

FIG. 7 shows a cylindrical drum-like unfinished bead 650 incorporating a pre-coated passive tag 652. The bead has a mesh support casing 656 with a decorative open cell design 657. The pre-coated passive tag 652 forms a lid of the drum-like unfinished bead 650, and the mesh support 656 surrounds the tag 652. Enamel or resin 658 is used to fill the space between the mesh support, within the decorative open cell design 657 and the tag 652. The open cell design is adapted to reduce interference between the tag 652 and a tag reader.

FIG. 8 shows a locket-type bead 760 incorporating a pre-coated passive tag 752 held in a ring-type casing 756. The casing 756 is configured to surround the outer circumference of the tag 752. The casing 756 and tag 752 are held in an orb shaped bead 757 which is made up of two dome shaped parts. The casing 756 and tag 752 may be designed to form a hinge with one of the domes, and therefore fold together in a compact manner. The two domes may be linked together on a chain or string, via a hoop. The other dome shaped part may be used to incorporate something chosen by the user, such as a lock of hair, or a photograph. The passive tag is accessed by opening the locket-type bead 760 by sliding the two domes relative to each other. The hoop acts as a pivot for the sliding motion of the two domes.

FIGS. 3 to 8 show a selection of many different types of beads having passive tags incorporated in some manner. Other methods may be used to incorporate passive tags into other pieces of jewelry in addition to those shown in FIGS. 3 to 8.

It is important that the passive tag does not experience temperatures above the temperature acceptable for the passive tag. Typically, temperatures below 100° C. are acceptable and do not unduly affect the readability of characteristics of the passive tags.

The materials used to manufacture the beads are preferably resistant to solvents such as acetone and methyl ethyl ketone.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An item of jewelry comprising:
   at least one passive tag, wherein the passive tag is provided with an antenna;
   at least one bead, ring, bracelet or pendant;
   wherein the passive tag is located on an outer surface of the bead, ring, bracelet or pendant, and wherein the bead, ring, bracelet or pendant further includes a layer of resin, glass, or a polymeric material on the outer surface of the bead, ring, bracelet or pendant, such that the passive tag is embedded in the layer of resin, glass or polymeric material on the outer surface of the bead, ring, bracelet or pendant; and
   wherein the passive tag is programmed with at least a unique identification code.

2. The item of jewelry as claimed in claim 1, wherein the at least one passive tag is a radio frequency identification (RFID) tag or chip configured to operate as a near field communication (NFC) tag or chip.

3. The item of jewelry as claimed in claim 2, wherein the at least one tag or chip operates on a very small range of less than about 1 cm.

4. The item of jewelry as claimed in claim 3, wherein the tag or chip is positioned on or in the item of jewelry to provide three dimensional readability of the tag or chip by the tag reader.

5. The item of jewelry as claimed in claim 4, wherein the at least one tag or chip is layered on to the surface of the item of jewelry.

6. A system comprising an item of jewelry, a smartphone having a display and a passive tag reading functionality, and a remote data storage device, wherein:
   the item of jewelry comprises:
      at least one passive tag provided with an antenna;
      at least one bead, ring, bracelet or pendant;
      wherein the at least one passive tag is located on an outer surface of the bead, ring bracelet or pendant, and wherein the bead, ring, bracelet or pendant further includes a layer of resin, glass, or a polymeric material on the outer surface of the bead, ring, bracelet or pendant, such that the at least one passive tag is embedded in the layer of resin, glass, or a polymeric material on the outer surface of the bead, ring, bracelet or pendant; and
      wherein the at least one passive tag is programmed with at least one unique identification code; and
   wherein the smart phone is adapted to read the at least one identification code from the embedded at least one passive tag when the smart phone and the item of jewelry touch or come into close proximity with each other; and
   the smartphone is configured to access a message or content that is associated with the unique identification code and stored on the remote data storage device and to retrieve and display the message or content on the display.

7. The system according to claim 6, wherein the reader is adapted to go through an authorisation stage whereby the unique identification code of the tag and an authorisation code assigned to the reader must match before the reader can access the message or content assigned to the identification code of the tag.

8. The system according to claim 6, wherein the message or content may be stored on a remote data storage device, and the tag reader is configured to be able to communicate with the remote data storage device.

9. The system according to claim 6, wherein the smartphone is able to connect to the Internet.

10. The system according to claim 6, wherein the tag reader is adapted to preload the message or content assigned to the unique identification code so that once preloaded, when the item of jewelry with a passive tag come into contact or close proximity to one another, the associated message or content is instantly displayed by the reader on a display.

11. A method of delivering an electronic message, comprising:
   providing an item of jewelry comprising at least one passive near field communication (NFC) tag, wherein the tag is further provided with an antenna;
      at least one bead, ring or pendant;
      wherein the at least one passive NFC tag is located on an outer surface of the bead, ring or pendant, and wherein the bead further includes a layer of resin, glass, or a polymeric material on the outer surface of the bead, ring or pendant, such that the at least one passive NFC tag is embedded in the layer of resin, glass, or a polymeric material on the outer surface of the bead, ring or pendant; and
      wherein the at least one passive NFC tag is programmed with at least one unique identification code;
   reading the unique identification code from the at least one passive NFC tag with a smartphone having a display and passive tag reading functionality; and
   using the unique identification code to request delivery of a message or content associated with the unique identification code to the smart phone to be displayed on the display of the smart phone.

12. The method according to claim 11, wherein the tag reader can only access the message or content associated with the unique identification code if it is an authorised tag reader.

13. The method according to claim 12, wherein the tag reader is provided with an authorisation code such as an IP address or SIM number.

14. The method according to claim 13, wherein the authorisation code of the tag reader and the identification code of the tag must match in order for the tag reader to be an authorised tag reader and the message be delivered.

* * * * *